J. P. TYE.
DRILL.
APPLICATION FILED MAY 5, 1909.

954,230.

Patented Apr. 5, 1910.

3 SHEETS—SHEET 1.

WITNESSES

INVENTOR
JOHN P. TYE,
BY
ATTORNEYS.

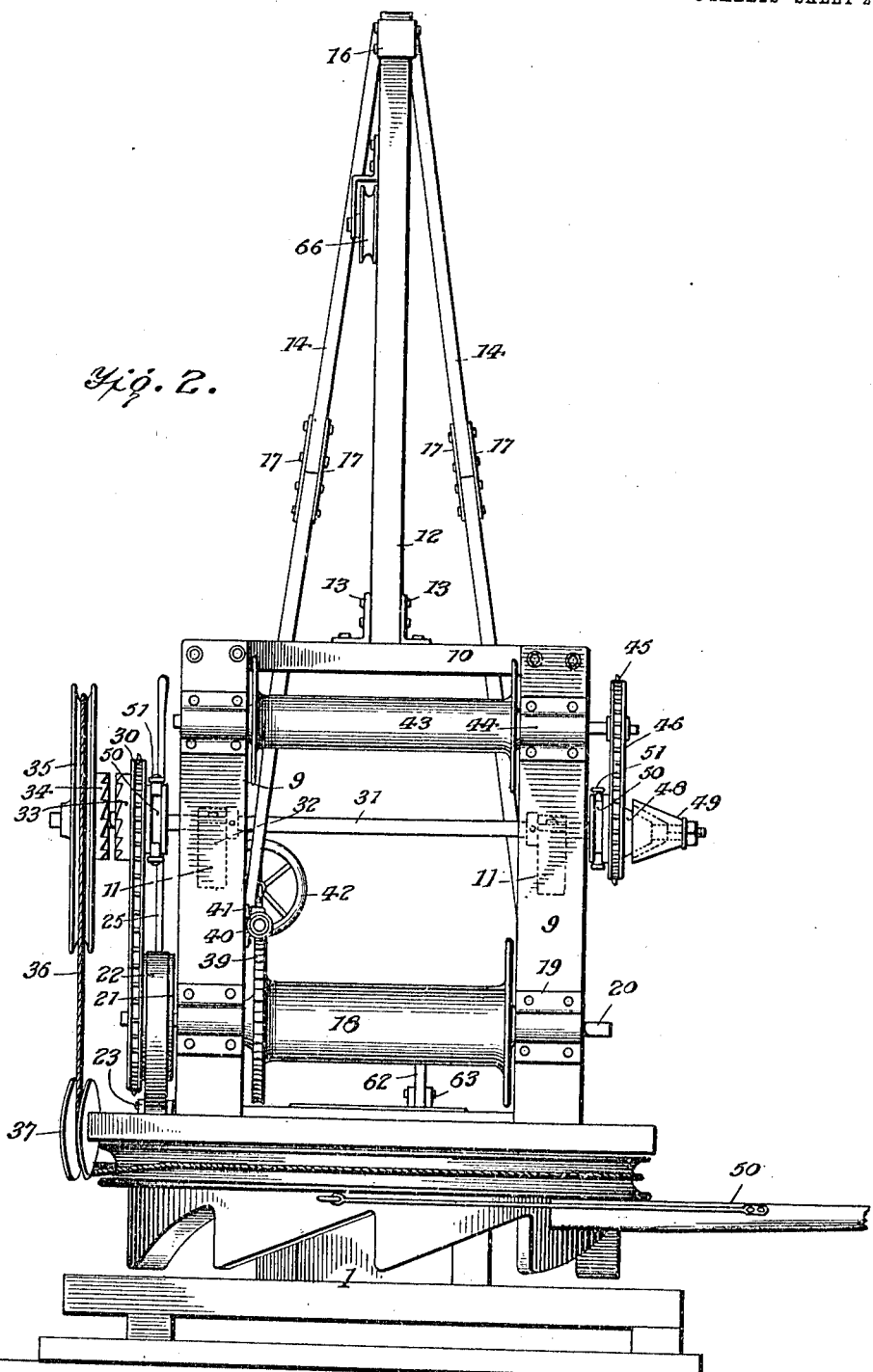

J. P. TYE.
DRILL.
APPLICATION FILED MAY 5, 1909.
954,230.
Patented Apr. 5, 1910.
3 SHEETS—SHEET 3.
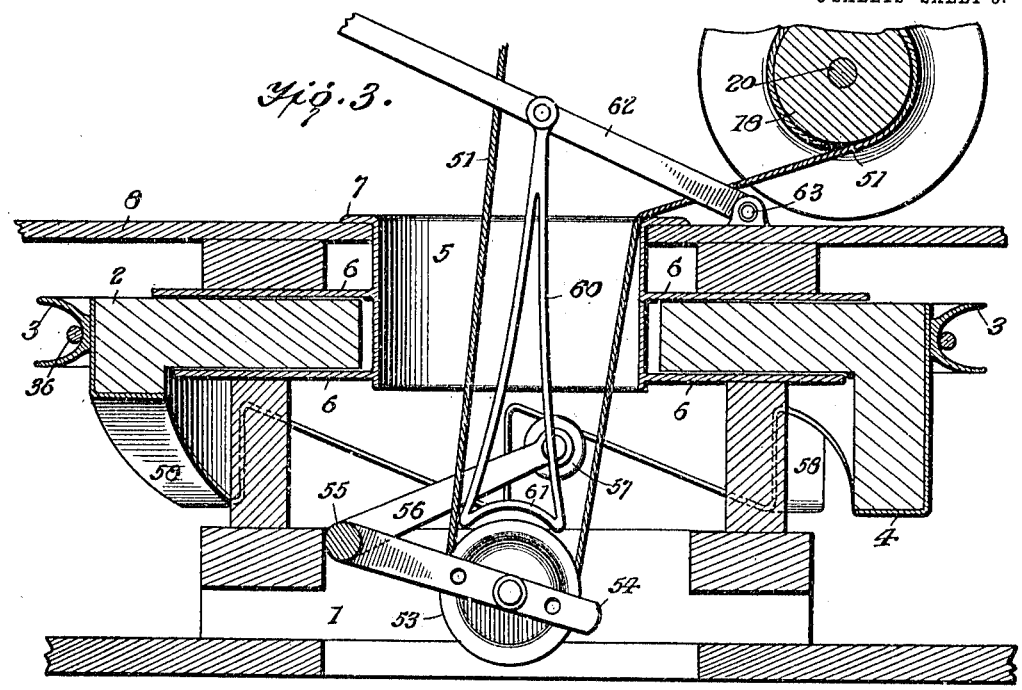
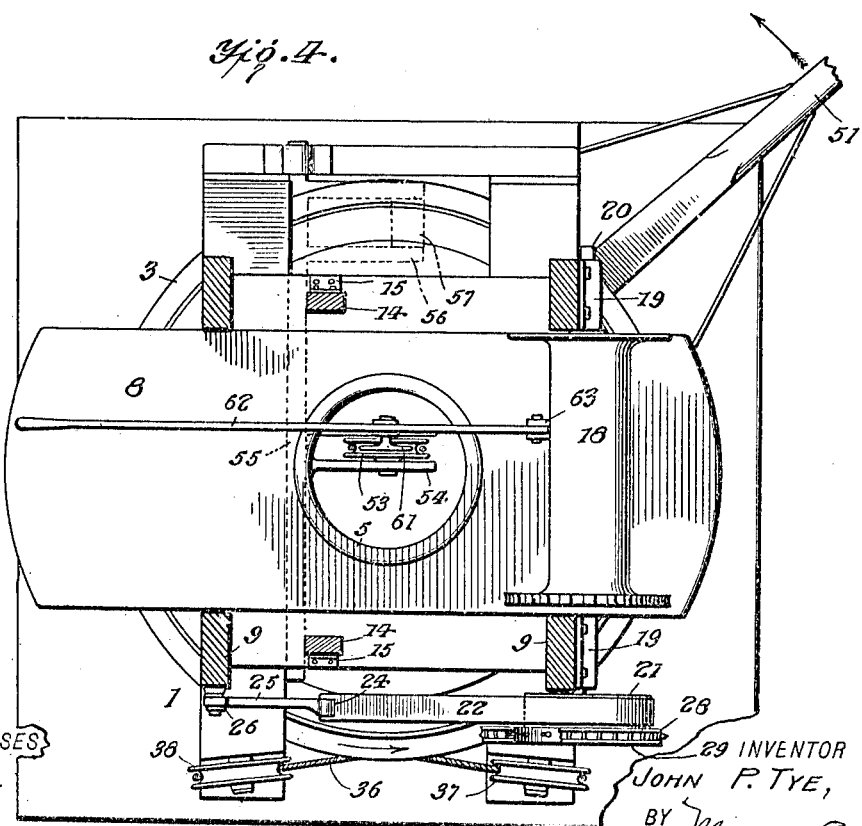
WITNESSES
INVENTOR
JOHN P. TYE,
BY
ATTORNEYS.

UNITED STATES PATENT OFFICE.

JOHN P. TYE, OF ROCHESTER, TEXAS.

DRILL.

954,230.

Specification of Letters Patent.  Patented Apr. 5, 1910.

Application filed May 5, 1909.  Serial No. 494,022.

*To all whom it may concern:*

Be it known that I, JOHN P. TYE, a citizen of the United States, and a resident of Rochester, in the county of Haskell and State of Texas, have invented certain new and useful Improvements in Drills, of which the following is a specification.

Figure 5:
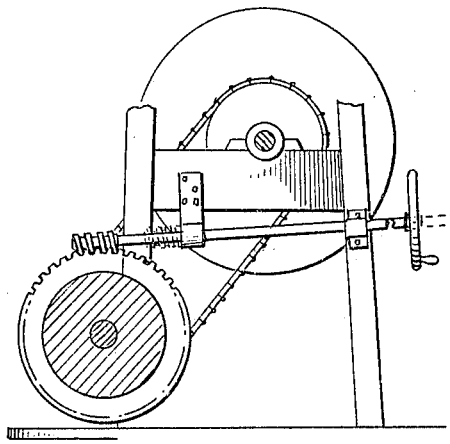
Figure 1:
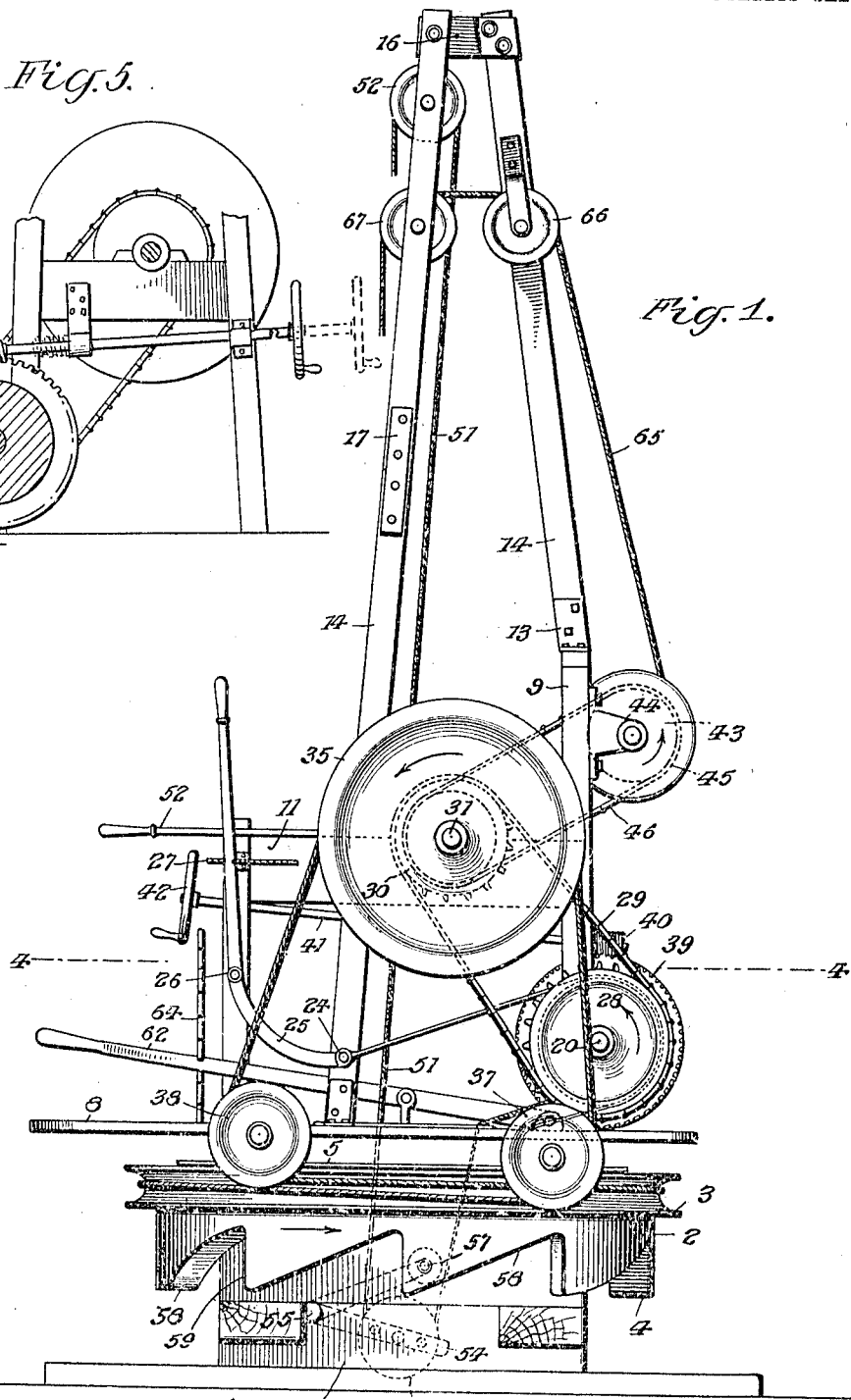

Referring to the drawings forming a part hereof, Figure 1 is an end view of the improvement. Fig. 2 is a side view. Fig. 3 is a partial vertical transverse section. Fig. 4 is a section on the line 4—4 of Fig. 1, and Fig. 5 is a detail view of the worm and the toothed flange showing the worm disengaged therefrom.

The present embodiment of the invention comprises a frame of substantial construction, comprising in the present instance a base 1, upon which is rotatably mounted a horizontal wheel 2, provided with a peripheral groove 3 for a purpose to be presently described, and with a plurality of lateral projecting ratchet teeth 4 on its lower face.

The wheel 2 is ring shaped as shown in Fig. 3, and a cylindrical casing 5 is arranged within the wheel, the casing being provided with upper and lower annular flanges 6 engaging above and below the wheel, and with a third flange 7 which rests upon a platform 8 forming a portion of the frame.

Above the wheel, the framework is provided with uprights 9, which are connected at their top by cross bars 10, 11, and one leg 12 of a tripod is secured to one of the cross bars 10, by means of angular brackets 13. The other legs 14 of the tripod are connected with the framework by angle brackets 15, and the three legs of the tripod are connected at their top by a bracket 16. The legs 14 consist each of two sections which are connected by fish plates 17.

A reel 18 is journaled in bearings 19 on a pair of uprights 9, the trunnions 20 of the reel projecting beyond the bearings at each end. One of the trunnions is provided with a brake wheel 21, engaged by a brake band 22, having one end secured to the frame as at 23, and the other connected as at 24, with a lever 25, journaled as at 26 on a forward upright, and adapted to engage a toothed quadrant 27 whereby to retain the lever in its adjusted position.

The above mentioned trunnion is also provided outside of the brake wheel with a sprocket wheel 28, connected by a sprocket chain 29 with a sprocket wheel 30, slidable on a shaft 31, journaled in bearings 32, on the cross-bars 11. The sprocket wheel 30 is provided with a clutch face 33, adapted to engage with a clutch face 34, integral with a groove pulley 35 over which passes a cable 36, which encircles the groove 3 on the wheel 2 before mentioned, the direction of the cable being changed by idlers 37, 38 journaled on the frame-work. It will be understood that the sprocket wheel 30 is loose on the shaft 31, in order that it will move longitudinally thereof, to engage or disengage the sections 33, 34 of the clutch.

One flange 39 of the drum or reel 18 is provided with gear teeth as shown in Fig. 2, which are engaged by a worm 40 on a shaft 41, journaled on the frame in bearings 41ª and provided at its free end with a hand wheel 42 for convenience in manipulating the shaft. It will be evident from the description that the reel may be rotated by means of the hand wheel and worm gear, or by power from the shaft 31. When not in use, the worm is disengaged from the gear teeth of the flange by rotating the worm shaft in a reverse direction until the worm is out of engagement with the flange.

A second reel 43 is journaled in bearings 44 on the uprights 9 above the reel 18, and parallel therewith, and the outer end of the reel shaft is provided with a sprocket wheel 45 connected by a sprocket chain 46, with a sprocket wheel 47 loosely mounted on the shaft 31. The sprocket wheel 46 has rigid therewith a clutch section 48, the other section 49 being secured to the shaft, and the two sections engage by friction when they are moved into contact by means to be presently described.

Each of the clutch sections 30 and 48 is provided with an annular groove 50 in which engages the forked arms 51 of levers 52 whereby to manipulate said clutches in a well understood manner.

It will be evident, that by moving the clutch sections 48, 49 into contact, the reel 43 will be driven from the shaft 31, which is moved continuously from the wheel 2, and the said wheel is adapted to be moved by a sweep 50ª of ordinary construction.

The drill rope 51, passes from the drill (not shown) over a pulley 52, journaled in the tripod, thence downwardly and over a pulley 53 journaled in the one pair of arms 54 of an elbow lever pivoted as at 55 on the frame, the other arm 56 being provided with a roller 57 which engages the faces of the ratchet teeth 4 before mentioned. From the pulley 53, the rope extends to the drum or reel 18 before mentioned, and winds thereon, in passing to and from the pulley 53, the drill rope passes through the cylindrical casing 5.

It will be evident from the description that as the wheel 2 rotates in the direction of the arrow in Fig. 1, the pulley 53 will be gradually depressed to raise the drill while the friction roll 57 is in engagement with the inclined face 58 of a tooth, and when the straight face 59 of the tooth is reached the arm 56 of the elbow lever will be suddenly released, permitting the weight of the drill to raise the pulley 53, and to make a sudden stroke in a downward direction.

The roller 53 is adapted to be engaged on its upper surface by a bracket 60 having a curved depression 61, fitting the face of the wheel and connected with a lever 62 pivoted as at 63 on the frame, the free end of the lever being adapted to engage a toothed quadrant 64 secured to the frame. By means of the lever and the bracket, the stroke of the drill may be stopped, and the pulley 53 locked in its lowermost position.

The reel 43 has winding thereon a rope 65 which passes over pulleys 66 and 67, journaled on the tripod at the front and rear thereof, the free end of the rope being adapted to be attached to the slush bucket, or sound pump.

By connecting the parts of the clutch 48, 49 the reel 43 may be rotated to raise the bucket or pump out of the drill hole.

I claim:

1. In a device of the class described, a frame, a wheel mounted for horizontal rotation thereon, and provided on its lower face with an annular series of downwardly projecting ratchet teeth, an elbow lever journaled below the wheel, a pulley journaled on one of the arms of the elbow lever, a friction roller on the other arm, and engaging the ratchet teeth, a drum mounted above the wheel, a drill rope passing under the pulley, and winding over the drum, a power shaft, means for connecting and disconnecting the drum with the power shaft, and manually controlled means for rotating the drum.

2. In a device of the class described, a frame, a wheel mounted for horizontal rotation thereon and provided on its lower face with an annular series of ratchet teeth, a drill rope, a drum journaled on the frame, and on which the drill rope winds, a pulley below the wheel over which the drill rope passes, an elbow lever journaled below the wheel, and on one of whose arms the pulley is journaled, a friction roller on the other arm engaging the ratchet teeth, and means for engaging and moving the pulley whereby to move the friction roller out of engagement with the teeth.

3. In a device of the class described, a drill rope, a pulley under which the drill rope passes, a drum on which the rope winds, a wheel mounted for horizontal rotation between the drum and the pulley, an elbow lever having one of its arms connected with the pulley, an annular series of ratchet teeth on the wheel for engaging the other arm to move the pulley, means for rotating the wheel, and means for connecting and disconnecting the drum and the wheel.

4. In a device of the class described, a frame, a tripod supported on the frame, a drill rope passing over the tripod, a wheel mounted for horizontal rotation on the frame, a hoisting drum above the wheel, and on to which the drill rope winds, an elbow lever below the wheel, a pulley on one of the arms of the lever, and under which the drill rope passes, the wheel being provided with an annular series of downwardly projecting ratchet teeth for engaging the other arm of the elbow lever, whereby to depress the pulley for the purpose set forth, and means for connecting and disconnecting the wheel and the drum.

5. In a device of the class described, a rotatable frame having on the lower face thereof an annular series of ratchet teeth, a tripod supported on the frame, a drill rope passing over the tripod, a hoisting drum on which the rope winds, an elbow lever below the drum, a pulley journaled on one of the arms of the lever under which the drill rope passes, and a wheel on the other arm, for engagement by the teeth of the frame.

6. In a device of the class described, a rotatable frame having on the lower face thereof an annular series of ratchet teeth, a tripod supported on the frame, a drill rope passing over the tripod, a hoisting drum on which the rope winds, an elbow lever below the drum, a pulley journaled on one of the arms of the lever under which the drill rope passes, a wheel on the other arm, for engagement by the teeth of the frame, a lever pivoted to the frame and a bracket depending from the lever and having a depression for engaging the wheel to hold it out of engagement with the teeth.

7. In a device of the class described, a rotatable frame having on the lower face thereof an annular series of ratchet teeth, a tripod supported on the frame, a drill rope passing over the tripod, a hoisting drum on which the rope winds, an elbow lever below the drum, a pulley journaled on one of the arms of the lever under which the drill rope passes, a wheel on the other arm, for engagement by the teeth of the frame and means for moving and retaining said wheel out of contact with the teeth.

JNO. P. TYE.

Witnesses:
BENNETT HESS,
J. S. MENEFEE.